(12) United States Patent
Kool et al.

(10) Patent No.: US 6,758,914 B2
(45) Date of Patent: Jul. 6, 2004

(54) PROCESS FOR PARTIAL STRIPPING OF DIFFUSION ALUMINIDE COATINGS FROM METAL SUBSTRATES, AND RELATED COMPOSITIONS

(75) Inventors: Lawrence Bernard Kool, Clifton Park, NY (US); James Anthony Ruud, Delmar, NY (US)

(73) Assignee: General Electric Company, Niskayuna, NY (US)

(*) Notice: Subject to any disclaimer, the term of this patent is extended or adjusted under 35 U.S.C. 154(b) by 287 days.

(21) Appl. No.: 09/682,862

(22) Filed: Oct. 25, 2001

(65) Prior Publication Data

US 2003/0083213 A1 May 1, 2003

(51) Int. Cl.[7] ............................................. B08B 7/04
(52) U.S. Cl. ............................. 134/28; 134/1; 134/3; 134/6; 427/140; 427/444
(58) Field of Search ..................... 134/2, 3, 41, 19, 134/1, 6, 26, 28; 427/140, 142, 444

(56) References Cited

U.S. PATENT DOCUMENTS

| | | | |
|---|---|---|---|
| 3,607,398 A | 9/1971 | Lucas | |
| 3,622,391 A | 11/1971 | Baldi | |
| 3,779,879 A | 12/1973 | Scott | |
| 4,327,134 A | 4/1982 | Baldi | |
| 4,678,552 A | 7/1987 | Chen | |
| 4,851,093 A | 7/1989 | Routsis | |
| 5,801,217 A | 9/1998 | Rodzewich et al. | |
| 5,976,265 A | 11/1999 | Sangeeta et al. | |
| 6,042,880 A | 3/2000 | Rigney et al. | |
| 6,599,416 B2 * | 7/2003 | Kool et al. | 205/717 |
| 2002/0100493 A1 * | 8/2002 | Kool et al. | 134/3 |

FOREIGN PATENT DOCUMENTS

| | | |
|---|---|---|
| EP | 0242583 | 6/1990 |
| EP | 1010782 | 6/2000 |
| EP | 1013787 | 6/2000 |

* cited by examiner

Primary Examiner—Alexander Markoff
(74) Attorney, Agent, or Firm—Paul J. DiConza; Patrick K. Patnode

(57) ABSTRACT

A method for selectively removing portions of a diffusion aluminide coating from a substrate is described. The coating is treated with an aqueous composition based on an acid having the formula $H_xZrF_6$, wherein x is an exemplary 2. The coating being removed is usually a noble metal-aluminide coating, and the substrate is typically a superalloy. Related compositions are also described.

32 Claims, 4 Drawing Sheets

FULL COATING
T=0

THIN ADDITIVE SUBLAYER
T=20 min

NO ADDITIVE SUBLAYER
T=40 min

DIFFUSION SUBLAYER INTACT
T=80

DIFFUSION SUBLAYER INTACT
T=120

PROCESS FOR PARTIAL STRIPPING OF DIFFUSION ALUMINIDE COATINGS FROM METAL SUBSTRATES, AND RELATED COMPOSITIONS

BACKGROUND OF INVENTION

The present invention relates to diffusion coatings for components exposed to oxidizing environments (i.e., the hostile thermal environment of a gas turbine engine). In some of the more specific embodiments, this invention teaches a process for selectively stripping the additive sublayer of diffusion aluminide coatings from metal substrates.

In order to increase the efficiency of gas turbine engines, higher operating temperatures are continuously sought. For this reason, the high temperature durability of the engine components must correspondingly increase. With the formulation of superalloys, such as nickel-base and cobalt-base, significant advances in high-temperature capabilities are being achieved. Consequently, in the absence of a protective coating, sensitive superalloy components (e.g., the turbine and combustor) typically will not endure long service exposures, without wear or damage. One such coating is referred to as an environmental coating, i.e., a coating that is resistant to oxidation and hot corrosion. This coating is typically formed by a diffusion process, e.g., using a pack cementation-type procedure, and usually contains aluminum.

The diffusion process generally entails reacting a surface component with an aluminum-containing gas composition. This forms two distinct sublayers, the outermost of which is referred to as the additive sublayer, and the innermost of which is a diffusion sublayer. The additive sublayer contains the environmentally-resistant intermetallic, represented by MAl; where M is iron, nickel or cobalt, depending on the substrate material. The MAl intermetallic is often the result of the diffusion of deposited aluminum into the substrate, and a general, outward diffusion of iron, nickel or cobalt from the substrate. During high temperature exposure in air, the MAl intermetallic forms a protective aluminum oxide (alumina) scale that inhibits oxidation of the coating and the underlying substrate. The chemistry of the additive sublayer can be modified by the presence of additional elements, such as chromium, silicon, platinum, rhodium, hafnium, yttrium and zirconium. As a result of changes in elemental solubility (in the local regions of the substrate and gradient), the diffusion sublayer is thus formed. Due to reactivity, the diffusion sublayer contains various intermetallic and metastable phases—products of all alloying elements from the substrate and coating.

Though significant advances have been made with environmental coating materials (and processes for forming such), they still require repair necessitated by erosion and thermal degradation. Moreover, the component on which the coating is formed must often be refurbished. The current state-of-the-art repair method is to completely remove a diffusion aluminide coating, I.e., a "full strip" of both the diffusion sublayer and the additive sublayer.

An example of a full stripping process is shown in FIGS. 1 and 2. FIG. 1 is a photomicrograph of a platinum aluminide diffusion coating applied over a superalloy substrate. In this figure, region A is a portion of a substrate, while region B generally represents the diffusion sublayer of a platinum aluminide diffusion coating. Region C is the additive sublayer of the diffusion coating. This additive sublayer serves as a protective layer over the substrate, e.g., a substrate in the form of a turbine wall. As shown in FIG. 1, diffusion sublayer B is incorporated into the upper region of the substrate. (Dotted line E represents the original surface of the substrate).

FIG. 2 is a photomicrograph of the coated substrate of FIG. 1, after a current, state-of-the art, full stripping technique. Both the additive sublayer and the diffusion sublayer have been removed. In this figure, region D is the remaining portion of the substrate. The original surface of the substrate is again indicated by dotted line E.

Although functional, this full stripping process relies on lengthy exposure to stripping chemicals at elevated temperatures, which causes complete removal of the additive and diffusion sublayers. The process may also significantly attack the underlying metallic substrate, resulting in alloy depletion and intergranular/interdendritic attack. This attack is most prevalent when a component being stripped has regions with different coating thicknesses, or has uncoated surface regions (e.g., the dovetail of a turbine blade). One unfortunate result may be the need for continuous, uneconomical coating replacements.

Accordingly, it is sometimes undesirable to remove a significant portion of the coating as shown in FIG. 2. For gas turbine blades and vane airfoils, removal of the diffusion sublayer can lead to excessively thinned walls, and drastically altered airflow characteristics.

It is apparent that a new process for removing coatings from substrates (i.e., metal substrates) should be welcome in the art. The process must be capable of removing only the additive sublayer of the coating, while not substantially affecting the diffusion sublayer.

SUMMARY OF INVENTION

The present invention generally provides a method of removing an additive sublayer of a diffusion aluminide coating from a metallic substrate. The process described herein is effective In selectively removing only the additive sublayer of a diffusion-aluminide coating. Such a procedure does not attack the underlying diffusion sublayer, including the substrate (see FIGS. 3 and 4, discussed below). In brief, FIG. 3 is a photomicrograph of a coated substrate similar to FIG. 1, prior to the stripping treatment according to the present invention. FIG. 4 depicts the same substrate, after treatment.

The present method comprises the step of contacting the diffusion aluminide coating with an aqueous composition comprising at least one acid having the formula $H_xZrF_6$, or precursors to said acid, wherein x is 1–6. The acid is typically present at a concentration in the range of about 0.05 M to about 5 M, where M represents molarity. (Molarity can be readily translated into weight or volume percentages, for ease in preparing the solutions). As described below, these compounds may sometimes be formed in situ.

An additional embodiment of the invention is directed to an aqueous composition used for the partial stripping of diffusion aluminide coatings. The substrate is a metallic material, and is often in the form of a superalloy component. As used herein, "partial stripping" of the coating refers to the selective removal of substantially all of the additive sublayer, while removing little or none of the underlying diffusion sublayer. The composition comprises an acid having the formula $H_x ZrF_6$, as mentioned above. The acid is usually present in the composition at levels described hereinafter.

Further details regarding the various features of this invention are found in the remainder of the specification.

DETAILED DESCRIPTION

Figure 2:
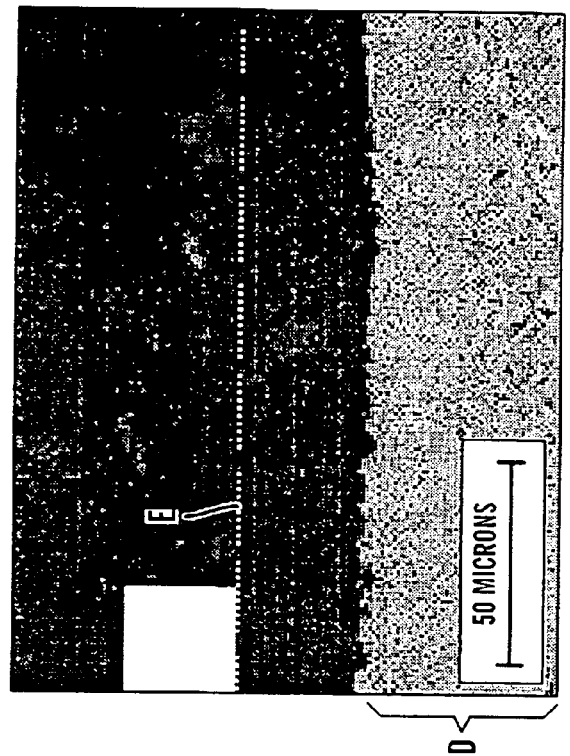
FIG. 2 is a cross-sectional photomicrograph of the coated substrate depicted in FIG. 1, after being treated by a current state-of-the-art stripping process.
Figure 1:
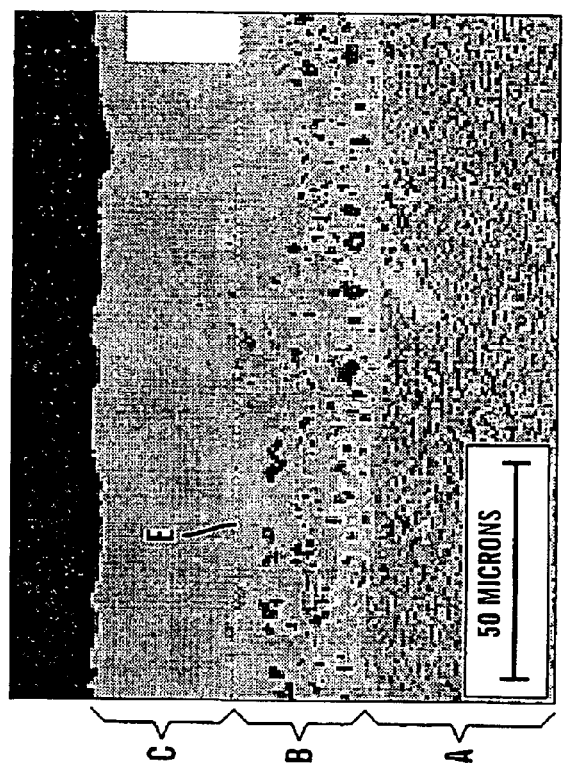
FIG. 1 is a cross-sectional photomicrograph of a platinum aluminide diffusion coating applied over a metal substrate, prior to any treatment.

The present invention is generally applicable to metal components that operate within high-temperature environments, and are therefore subjected to oxidation and hot corrosion. Non-limiting examples of such components include the high and low-pressure turbine blades and vanes of gas turbine engines. While the advantages of this invention are particularly applicable to nickel-base superalloy components of gas turbine engines, the teachings of this invention are generally applicable to any component on which a diffusion aluminide coating may be used.

As mentioned above, the method of this invention is directed to the removal of the additive sublayer of an aluminide coating on the surface of a component, without removing or damaging the underlying diffusion sublayer of the system. As is known in the art, aluminiding processes produce an additive sublayer and a diffusion sublayer. The diffusion sublayer lies between the additive sublayer and the substrate, and is incorporated into the upper region of the substrate. To promote oxidation resistance, at least one noble metal is usually deposited on the substrate prior to aluminiding, such that the additive sublayer should include these beneficial noble metal-aluminide intermetallic phases. (As used herein, the noble metal is usually platinum, palladium, or mixtures thereof. However, "noble metal" is meant to embrace the elements set forth in the definition in The Condensed Chemical Dictionary, 10th Ed., G. Hawley, Van Nostrand Reinhold, 1981. Thus, other possibilities include gold, silver, iridium, rhodium, and ruthenium). Beneath the additive sublayer, the diffusion sublayer contains various intermetallic and metastable phases that are the products of some of the alloying elements of the substrate and the diffusion coating.

The thickness of a diffusion aluminide coating on a gas turbine engine component is typically about 10 to about 125 micrometers. Diffusion aluminide coatings can be formed by vapor phase aluminiding (VPA), pack cementation, or chemical vapor deposition (CVD) techniques, although it is foreseeable that other techniques could be used as well.

The aqueous composition for embodiments of this invention includes an acid having the formula $H_x ZrF_6$. The subscript x is a quantity from 1 to 6, and more typically, from 1 to 3. Materials of this type are available commercially, or can be prepared without undue effort. The preferred acid is $H_2 ZrF_6$. This material is referred to by several names, such as "hydrofluozirconic acid", "fluorozirconic acid", and "hexafluorozirconic acid".

Precursors to the $H_x ZrF_6$ acid may also be used. A "precursor" refers to any compound, or group of compounds, which can be combined to form the acid or its dianion $ZrF^{-2}$. Under reactive conditions, e.g. the action of heat, agitation, catalysis, and the like, precursors can also be transformed into the acid or its dianion. Thus, the acid can be formed in situ in a variety of ways, e.g., in a reaction vessel.

As an illustration, the precursor may be a metal salt, inorganic salt, or an organic salt in which the dianion is ionically bound. Non-limiting examples include salts of Ag, Na, Ni, K, and , as well as organic salts, such as a quaternary ammonium salt. Dissociation of these salts in an aqueous solution yields the acid. In the case of $H_2 ZrF_6$, a convenient salt that can be employed is $Na_2 ZrF_6$.

Those skilled in the art are familiar with the use of compounds that cause the formation of $H_x ZrF_6$ within an aqueous composition. For example, $H_2 ZrF_6$ can be formed in situ by the reaction of a zirconium-containing compound with a fluorine-containing compound. An exemplary zirconium-containing compound is $ZrO_2$, while an exemplary fluorine-containing compound is hydrofluoric acid (i.e., aqueous hydrogen fluoride).

When used as a single acid, the $H_x ZrF_6$ acid appears to be quite effective for removing the coatings described above, without depleting the diffusion sublayer. Moreover, the $H_x ZrF_6$ acid appears to be especially useful in removing platinum aluminide.

The preferred level of acid employed will depend on various factors, such as the type and amount of coating being removed; the location of the coating material on a substrate; the type of substrate; the thermal history of the substrate and coating (e.g., the level of interdiffusion); the technique by which the substrate is being exposed to the treatment composition (as described below); the time and temperature used for the treatment; and the stability of the acid in solution.

In general, the $H_x ZrF_6$ acid is present in a treatment composition at a level in the range of about 0.05 M to about 5 M. Usually the level is in the range of about 0.5 M to about 3.5 M. In the case of $H_2 ZrF_6$, a preferred concentration range is often in the range of about 2.5 M to about 3.5 M.

The aqueous composition of the present invention may also include various additives that serve a variety of functions, such as catalytic regulators. Non-limiting examples of these additives are inhibitors, dispersants, surfactants, chelating agents, wetting agents, deflocculants, stabilizers, anti-settling agents, and anti-foam agents. Those of ordinary skill in the art are familiar with specific types of such additives, and with effective levels of use. An example of an inhibitor for the composition is a relatively weak acid like acetic acid. Such a material tends to lower the activity of the primary acid in the composition. This is desirable in some instances, e.g., to decrease the potential for pitting of the substrate surface.

Other types of inhibitors can also be used. Some are described in the Handbook of Corrosion Engineering, P. Roberge, McGraw-Hill, NY 1999, e.g., pp. 833–862, which is incorporated herein by reference. Many inhibitors are available commercially, e.g., the various Rhodine products available from Henkel Surface Technologies, Inc., Madison Heights, Mich. One non-limiting example of such a composition comprises a combination of a mixture of alkyl pyridines with dialkyl thioureas.

Various techniques can be used to treat the substrate with the aqueous composition. For example, the substrate can be continuously sprayed with the composition, using various types of spray guns, or a single spray gun could be employed. Similarly, a line of guns could be used, and the substrate could pass alongside or through the line of guns (or multiple lines of guns). As still another alternative, the coating removal composition could simply be poured over the substrate (and continuously recirculated).

In preferred embodiments, the substrate is immersed in a bath of the aqueous composition. Immersion in this manner (in any type of vessel) often permits the greatest degree of contact between the aqueous composition and the coating that is being removed. Immersion time and bath temperature will depend on many of the factors described above, such as the type of coating being removed, and the amount of acid being used in the bath. Usually, the bath is maintained at a temperature in the range of about room temperature to about 100° C., while the substrate is immersed therein. In preferred embodiments, the temperature is maintained in the range of about 30° C. to about 85° C. In some especially preferred embodiments, the temperature range is about 35° C. to about 55° C. The immersion time may vary considerably, but it is usually in the range of about 1 minute to about 10 hours, and preferably, in the range of about 10 minutes to about 4 hours. (Longer immersion times may compensate for lower bath temperatures). Typically, the bath is stirred or agitated during the treatment process.

As a result of treatment, the article in the stripping bath usually forms a residue referred to as "smut" or "coating residue." This occurs because the degraded, additive sublayer material continues to weakly adhere to the underlying diffusion sublayer-substrate. Consequently, treatment is usually followed by a post-stripping step, often referred to as a "de-smutting" operation. Such a step is known in the art, and described in various references. It may be in the form of an abrasion step, employed because it minimizes damage to the underlying sublayer and the substrate, e.g., grit blasting. For example, a pressurized air stream (usually less than about 100 psi.), containing aluminum oxide particles, can be directed across the surface. The duration of grit blasting in this embodiment will depend on various factors, such as the thickness and specific composition of the smut-layer; the size and type of grit media, and the like. Typically, the process is carried out for about 30 seconds to about 3 minutes.

Other known techniques for abrading the surface may be used in lieu of grit-blasting. Many of these are described in U.S. Pat. No. 5,976,265, incorporated herein by reference. For example, the surface can be manually scrubbed with a fiber pad, e.g. a pad with polymeric, metallic, or ceramic fibers. Alternatively, the surface can be polished with a flexible wheel or belt in which aluminum or silicon carbide particles have been embedded. Liquid abrasive materials may alternatively be used on wheels or belts. These alternative techniques would be controlled in a manner that maintained a contact force against the surface that was no greater than the force used in the grit-blasting technique discussed above.

Other techniques (or combinations of techniques) could be employed in place of abrasion, to remove the degraded material. Examples include tumbling of the article (e.g., water-tumbling), or laser ablation of its surface. Alternatively, the degraded material could be scraped off the surface. As still another alternative, sound waves (e.g., ultrasonic) could be directed against the surface, causing vibrations that can shake loose the degraded material. For each of these alternative techniques, those skilled in the art would be familiar with operating adjustments that are made to control the relevant force applied against the surface of the articles (as in the case of the abrasion technique), to minimize damage to the substrate or coating sublayer being preserved. The article is sometimes rinsed after this step, e.g., using water or a combination of water and a wetting agent.

According to this invention, a variety of substrates may include the coating(s) being removed. Usually, the substrate is a metallic material. As used herein, "metallic" refers to substrates which are primarily formed of metal or metal alloys, but which may also include some non-metallic components. Non-limiting examples of metallic materials are those which comprise at least one element selected from the group consisting of iron, cobalt, nickel, aluminum, chromium, titanium, and mixtures which include any of the foregoing (e.g., stainless steel).

Very often, the metallic material is a superalloy. Such materials are known for high-temperature performance, in terms of tensile strength, creep resistance, oxidation resistance, and corrosion resistance, for example. The superalloy is typically nickel-, cobalt-, or Iron-based, although nickel- and cobalt-based alloys are favored for high-performance applications. The base element, typically nickel or cobalt, is the single greatest element in the superalloy by weight. Illustrative nickel-base superalloys include at least about 40% Ni, and at least one component from the group consisting of cobalt, chromium, aluminum, tungsten, molybdenum, titanium, and iron. Examples of nickel-base superalloys are designated by the trade names Inconel®, Nimonic®, Rene®,(e.g., Rene80®, Rene 95®, Rene142®, and Rene N5® alloys), and Udimet®, and include directionally solidified and single crystal superalloys. Illustrative cobalt-based superalloys include at least about 30 wt % Co, and at least one component from the group consisting of nickel, chromium, aluminum, tungsten, molybdenum, titanium, and iron. Examples of cobalt-base superalloys are designated by the trade names Haynes®, Nozzaloy®, Stellite® and Ultimet®.

The actual configuration of a substrate may vary widely. As a general illustration, the substrate may be in the form of a houseware item (e.g., cookware) or a printed circuit board substrate. In many embodiments, superalloy substrates are in the form of turbine engine components, such as combustor liners, combustor domes, shrouds, or airfoils. The present invention is useful for removing coatings from the flat areas of substrates, as well as from curved or irregular surfaces that may include indentations, hollow regions, or holes (e.g., film cooling holes).

The method of the present invention may be used in conjunction with a process for repairing protective coatings that are sometimes applied over the coatings described above. As an example, thermal barrier coatings (TBC's) are frequently applied over aluminide coatings to protect turbine components from excessive thermal exposure. The periodic overhaul of the TBC sometimes requires that the underlying sublayers also be removed. The TBC can be removed by various methods, such as grit blasting or chemical techniques. The process described above can then remove the underlying coating or multiple coatings. The component can subsequently be conventionally re-coated with aluminide, followed by standard coating with fresh TBC.

An additional embodiment of this invention relates to a method for replacing a worn or damaged protective coating applied over a substrate. As used herein, "worn" is meant to describe a coating which no longer offers a desired level of oxidation protection. The first step of this embodiment is the partial chemical stripping of the coating by the process described above. In other words, the substrate is contacted with an aqueous composition comprising the HxZrF6 compound, or its precursors. De-smutting and rinsing steps, previously discussed, usually follow the treatment.

The replacement coating can then be applied to the substrate. Examples of coatings to be applied include the diffusion-aluminide coatings, and overlay coatings. A non-limiting example of an overlay coating is one having a composition of the formula MCrAl (X), where M is an element selected from the group consisting of Ni, Co, Fe, and combinations thereof; and X is an element selected from the group consisting of Y, Ta, Si, Hf, Ti, Zr, B, C, and combinations thereof. Diffusion aluminide coatings can be applied as described previously. The overlay coatings are also applied to the surface by conventional techniques, such as high velocity oxy-fuel (HVOF), plasma spray (e.g., air plasma spray), physical vapor deposition, and the like. Those skilled in the art are aware of other aspects of the coating process, e.g., cleaning and/or surface roughening steps, when appropriate.

As mentioned before, repeated stripping and re-applications of diffusion-aluminide coatings can undesirably alter the thickness of the substrate, e.g., a turbine airfoil. When the partial stripping process of this invention is carried out, the additive sublayer of such a coating can be repeatedly removed and replaced. Thus, the specified wall thickness of the airfoil can be maintained for a greater service period. This advantage is an important feature in a commercial setting, where component replacement and repair is a time-consuming and expensive undertaking.

The above-described process selectively removes the additive sublayer of the diffusion aluminide-coatings. The underlying diffusion sublayer remains substantially unaffected. Moreover, the process does not attack or deplete the substrate. Once the additive sublayer is removed from the coating, the component may undergo de-smutting and deposition of a new coating.

The following examples are merely illustrative, and should not be construed to be any sort of limitation on the scope of the claimed invention. In each instance of coating removal, the stripping step was followed by a de-smutting step, as described above. Usually, de-smutting consisted of grit blasting, followed by air-blowing of the surface.

EXAMPLE 1

Figure 3:
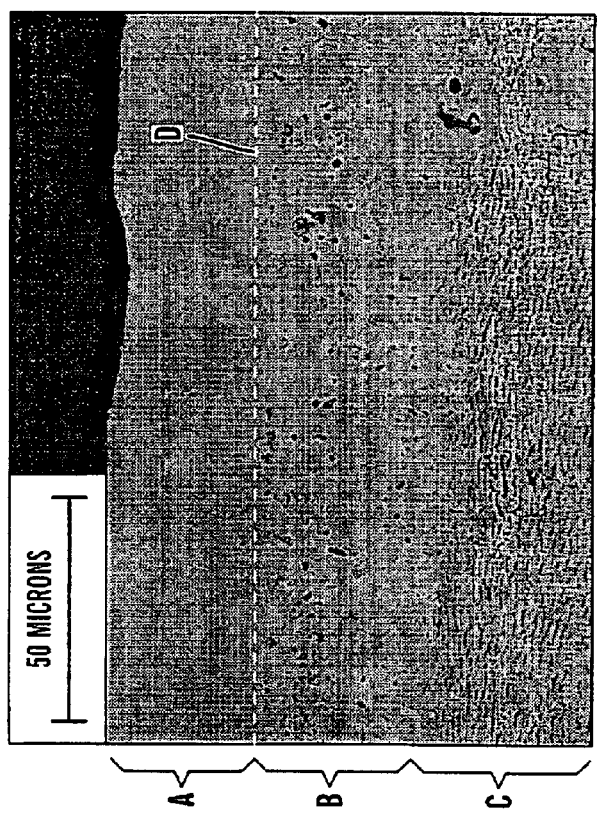
FIG. 3 is a cross-sectional photomicrograph of a coated substrate similar to that in FIG. 1, before being treated according to this invention.
Figure 5:
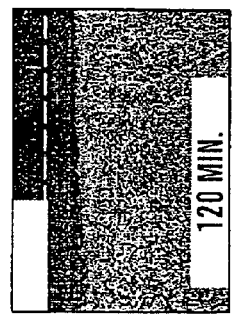
FIGS. 5–8 represent a time series of cross-sectional photomicrographs of a coating system similar to that of FIG. 1, after being treated by the present invention's partial stripping process.
Figure 6:
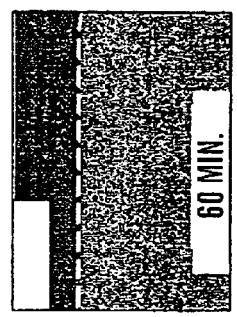
Figure 7:
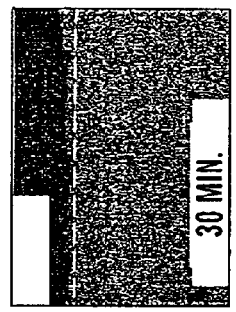
Figure 8:
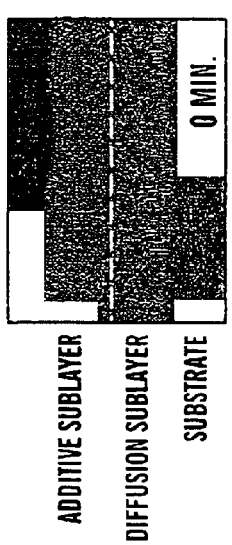
Figure 9:
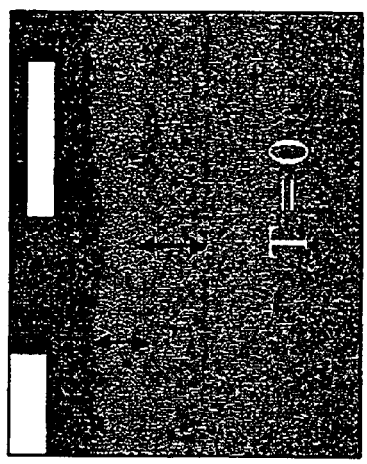
FIGS. 9–13 represent another time series of cross-sectional photomicrographs of a coating similar to that of FIG. 1, after being treated by the present invention's partial stripping process.
Figure 10:
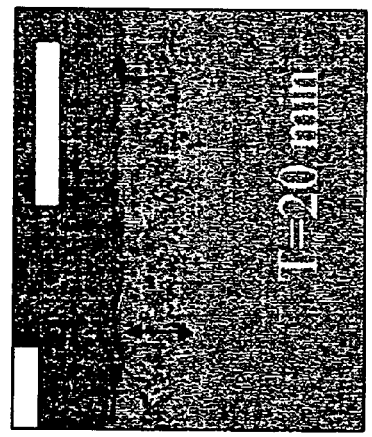
Figure 11:
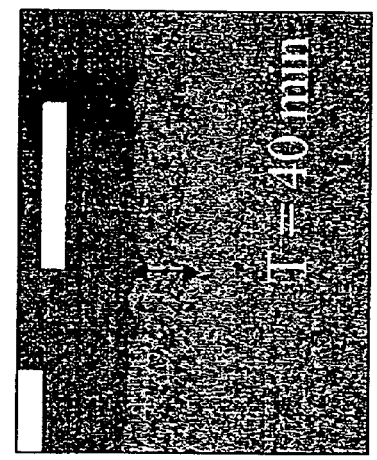
Figure 12:
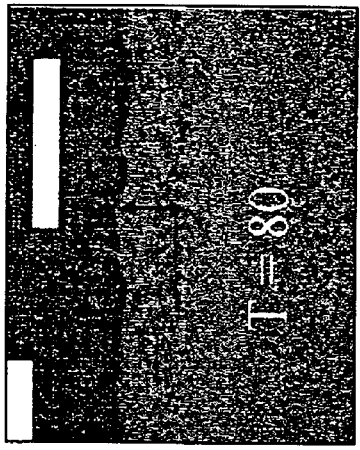
Figure 13:
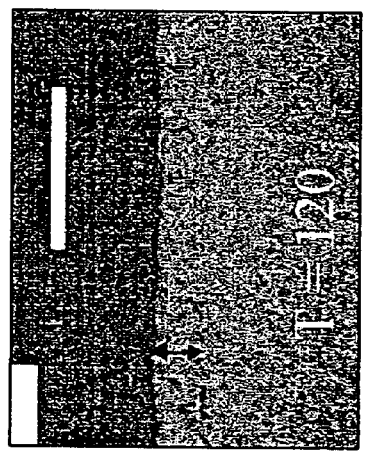

A coupon formed of a nickel-based superalloy was coated with platinum aluminide and heat treated at 1121° C. for 47 hours, to simulate the diffusion of the coating into the base metal that would occur in a real part in service. A cross-section of the coated coupon is depicted in FIG. 3. In that figure, region A is the additive sublayer; region B is the diffusion sublayer (i.e., incorporated into an upper portion of the substrate) and Region C is the substrate (i.e., the unaffected portion). Line D has been inserted to indicate the original substrate surface.

Figure 4:
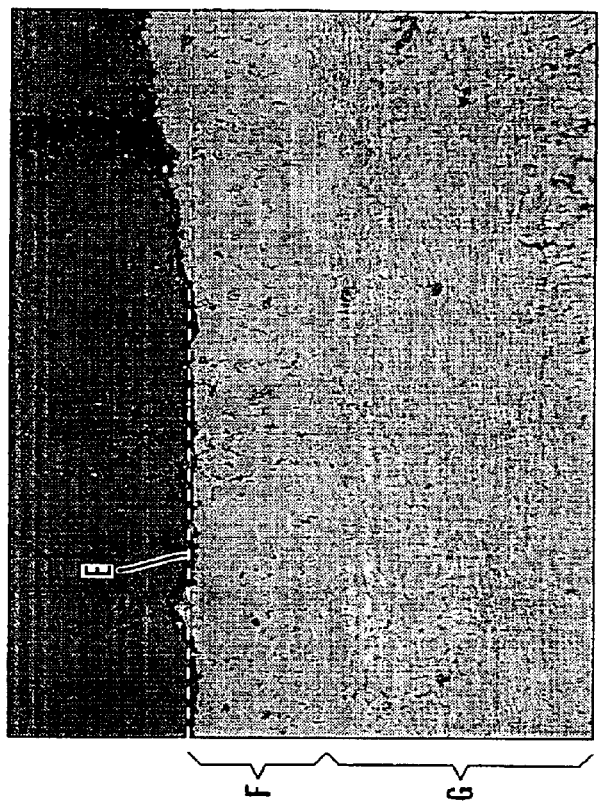
FIG. 4 is a cross-sectional photomicrograph of the coated substrate of FIG. 3, after treatment according to this invention.

The coupon was then immersed in a bath containing 45 wt % hexafluorozirconic acid ($H_2 ZrF_6$), at 70° C., for 2.5 hours. After this "partial stripping" treatment, the part was covered with black smut. The smut was removed by means of a gentle grit blast treatment at 40 psig. Metallographic examination indicates that the additive sublayer was removed without affecting the diffusion sublayer, as depicted in FIG. 4. In this figure, line E has been inserted to generally indicate the original substrate surface. It is evident that substantially all of the additive sublayer has been removed. Region F is the unaffected diffusion sublayer, and Region G is the substrate.

EXAMPLE 2

Sections were cut from the airfoil of an aircraft engine blade on which a platinum aluminide coating had been applied. The coupon was then immersed in a bath containing 45-wt % hexafluorozirconic acid ($H_2 ZrF_6$) at 70° C., for varying amounts of time. After the chemical treatment, the coupons were sectioned through the thickness of the wall, mounted in epoxy, and polished. Micrographs of blade sections treated for 0 minutes, 30 minutes, 60 minutes, and 120 minutes are shown in FIGS. 5–8. (The original surface of the substrate is indicated by the dotted line).

After 30 minutes of treatment, the additive sublayer was removed, and the diffusion sublayer was intact. (It is believed that removal of the additive sublayer actually occurred in less than 30 minutes, although a detailed examination was not undertaken within that interval). After 60 minutes, negligible removal of the diffusion sublayer had occurred. After 120 minutes, the diffusion sublayer was removed, but the substrate remained intact. Thus, the selectivity of this process (ratio of additive coating removal time to diffusion coating removal time) was at least about 2:1. Such a selectivity value in this instance represents a very desirable process window, which provides flexibility in a large-scale treatment facility.

EXAMPLE 3

As in Example 2, sections were cut from the airfoil of an aircraft engine blade on which a platinum aluminide coating had been applied. The coupon was then immersed in a bath containing 45-wt % hexafluorozirconic acid ($H_2 ZrF_6$) at 45° C., for varying amounts of time. After the chemical treatment, the coupons were sectioned through the thickness of the wall, mounted in epoxy, and polished.

Micrographs of blade sections, treated for 0 minutes, 20 minutes, 40 minutes, 80 minutes, and 120 minutes, are shown in FIGS. 9–13. (The additive sublayer is generally indicated by the upper double-headed arrow, while the diffusion sublayer is generally indicated by the lower, double-headed arrow). After 20 minutes of treatment, the additive sublayer was mostly removed, and the diffusion sublayer was intact. After 40 minutes, the additive sublayer was fully removed, and the diffusion sublayer remained intact.

After 80 minutes of treatment, there was little change in the appearance of the diffusion sublayer. After 120 minutes, only negligible removal of the diffusion sublayer had occurred, and the substrate was unaffected, i.e., remaining completely protected.

Thus, the selectivity of this process (ratio of additive coating removal time to diffusion coating removal time) under these conditions was greater than about 3:1. As in Example 2, a very desirable process window has been demonstrated.

While this invention has been described in terms of preferred embodiments, it is apparent that one skilled in the art could adopt other forms. Accordingly, the scope of this invention is to be limited only by the following claims.

What is claimed is:

1. A chemical stripping method for selectively removing a diffusion aluminide coating from a substrate, comprising the step of contacting the coating with an aqueous composition comprising at least one acid having the formula $H_x ZrF_6$, or precursors to said acid, wherein x is 1–6.

2. The method as recited in claim 1, wherein x is 1–3.

3. The method as recited in claim 1, wherein the acid is present at a concentration in the range of about 0.05 M to about 5 M.

4. The method as recited in claim 3, wherein the acid is present at a concentration in the range of about 0.5 M to about 3.5 M.

5. The method as recited in claim 1, wherein the precursor is a salt of the acid.

6. The method as recited in claim 1, wherein the aqueous composition comprises the compound $H_2 ZrF_6$.

7. The method as recited in claim 6, wherein the $H_2 ZrF_6$ compound is formed in situ within the aqueous composition, by the dissociation of a corresponding salt of the compound; or by the reaction of a zirconium-containing compound with a fluorine-containing compound.

8. The method as recited in claim 7, wherein the zirconium-containing compound is $ZrO_2$, and the fluorine-containing compound is HF.

9. The method of claim 1, wherein the substrate is immersed in a bath of the aqueous composition.

10. The method of claim 9, wherein the aqueous composition is maintained at a temperature in the range of room temperature to about 100° C.

11. The method of claim 10, wherein the aqueous composition is maintained at a temperature in the range of about 30C. to about 85C.

12. The method of claim 10, wherein the substrate is immersed in the aqueous composition for a time period in the range of about 1 minute to about 10 hours.

13. The method as recited in claim 1, wherein the aqueous composition further comprises at least one additive selected from the group consisting of inhibitors, dispersants, surfactants, chelating agents, wetting agents, deflocculants, stabilizers, anti-settling agents, and anti-foam agents.

14. The method as recited in claim 1, wherein the diffusion aluminide coating comprises a diffusion sublayer over the substrate, and an additive sublayer over the diffusion sublayer.

15. The method as recited in claim 14, wherein the coating being removed is the additive sublayer, while the diffusion sublayer is substantially unaffected.

16. The method as recited in claim 1, wherein the diffusion aluminide material is a noble metal-aluminide, and the noble metal is selected from the group consisting of platinum, palladium, and mixtures thereof.

17. The method as recited in claim 1, wherein the substrate comprises at least one element selected from the group consisting of iron, cobalt, nickel, aluminum, chromium, titanium, and mixtures that include any of the foregoing metallics.

18. The method as recited in claim 17, wherein the substrate comprises a superalloy.

19. The method as recited in claim 18, wherein the superalloy is nickel-based or cobalt-based.

20. The method as recited in claim 19, wherein the superalloy is a component of a turbine engine.

21. The method as recited in claim 20, wherein the component comprises an airfoil.

22. The method as recited in claim 1, further comprising the step of removing coating residue after treatment in the aqueous composition.

23. The method as recited in claim 22, wherein the coating residue is removed by a technique selected from the group consisting of abrasion, tumbling, laser ablation, and ultrasonic agitation.

24. The method as recited in claim 23, wherein the abrasion is carried out by a grit-blasting technique.

25. A chemical stripping method for selectively removing a diffusion platinum-aluminide coating from a superalloy substrate, comprising the step of treating the substrate with an aqueous composition comprising at least one acid having the formula $H_x ZrF_6$; wherein x is 1–6.

26. The method of claim 25, wherein the substrate is treated with the aqueous composition in a bath, for a period of time sufficient to remove an overlying additive sublayer of the coating, while not substantially removing an underlying diffusion sublayer of the coating.

27. The method of claim 26, wherein the substrate is a turbine component or combustor component of a gas turbine engine.

28. A method for replacing a worn or damaged diffusion aluminide coating applied over a substrate, comprising the following steps:

(i) chemically removing the worn or damaged coating by contacting the substrate with an aqueous composition, wherein the aqueous composition comprises an acid having the formula $H_x ZrF_6$, where x is 1–6, or precursors to said acid; and then (ii) applying a new coating over the substrate.

29. The method of claim 28, wherein the diffusion aluminide coating comprises a diffusion sublayer which lies over the substrate, and an additive sublayer which lies over the diffusion sublayer.

30. The method of claim 29, wherein the additive sublayer is removed, while the diffusion sublayer is substantially unaffected.

31. The method of claim 28, wherein the new coating is a diffusion-aluminide coating or an overlay coating.

32. The method of claim 31, wherein the overlay coating comprises a composition of the formula MCrAl(X), where M is an element selected from the group consisting of Ni, Co, Fe, and combinations thereof; and X is an element selected from the group consisting of Y, Ta, Si, Hf, Ti, Zr, B, C, and combinations thereof.

* * * * *